US009852861B2

(12) United States Patent
Black

(10) Patent No.: US 9,852,861 B2
(45) Date of Patent: Dec. 26, 2017

(54) ADDRESSABLE ELECTRIC SAFETY CONTACT MONITORING SYSTEM

(71) Applicant: Balmore Black, Highland Falls, NY (US)

(72) Inventor: Balmore Black, Highland Falls, NY (US)

( * ) Notice: Subject to any disclaimer, the term of this patent is extended or adjusted under 35 U.S.C. 154(b) by 226 days.

(21) Appl. No.: 14/852,559

(22) Filed: Sep. 12, 2015

(65) Prior Publication Data

US 2017/0076892 A1    Mar. 16, 2017

(51) Int. Cl.
*H01H 47/02* (2006.01)
*H01H 47/00* (2006.01)
*G06F 13/40* (2006.01)

(52) U.S. Cl.
CPC ....... *H01H 47/002* (2013.01); *G06F 13/4022* (2013.01); *G06F 13/4068* (2013.01)

(58) Field of Classification Search
CPC .. H01H 47/02; G06F 13/4022; G06F 13/4068
USPC ........................................................ 307/112
See application file for complete search history.

(56) References Cited

U.S. PATENT DOCUMENTS

| 4,512,442 | A | 4/1985 | Moore |
|---|---|---|---|
| 4,930,604 | A | 6/1990 | Schienda |
| 5,347,094 | A | 9/1994 | Leone et al. |
| 5,476,157 | A | 12/1995 | Todaro |
| 5,616,895 | A | 4/1997 | Spiess |
| 5,644,111 | A | 7/1997 | Cerny et al. |
| 5,780,787 | A | 7/1998 | Kamani |
| 6,382,362 | B1 | 5/2002 | Lutz |
| 6,684,055 | B1 | 1/2004 | Blackaby |
| 6,854,565 | B2 | 2/2005 | Peralaet |
| 6,945,363 | B2 | 9/2005 | Angst |
| 6,988,594 | B2 | 1/2006 | Deplazes |
| 7,004,289 | B2 | 2/2006 | Shrum, III |
| 7,193,510 | B2 | 3/2007 | Nickels |

*Primary Examiner* — Hal Kaplan
(74) *Attorney, Agent, or Firm* — Koffsky Schwalb LLC; Mark I. Koffsky

(57) ABSTRACT

An addressable electrical safety contact monitoring system is described. The system includes an input terminal connected to an external signal relating to a safety fault, a first signal wire connect the input terminal, a switch having a default position and an active position, a first electric connection between the input terminal and a switch, a microprocessor, a second electric connection between the microprocessor and the switch, an address-section mechanism, an output terminal and a third electric connection between the microprocessor and the output terminal. When the external signal is activated, the switch changes from the default position to the active position, the microprocessor is activated and the microprocessor activates a signal on the third electric connection corresponding to the address-selection mechanism.

20 Claims, 5 Drawing Sheets

ADDRESSABLE ELECTRIC SAFETY CONTACT MONITORING SYSTEM

FIELD OF THE DISCLOSURE

The present invention relates to improvements in electrical safety monitoring systems including methods for creating an addressable electrical safety contact monitoring system. The product described herein may be titled an "Electronic Safety Contact Monitor" (ESCM) or ESCM 2000™.

BACKGROUND

Monitoring systems are utilized in a wide variety of mechanical and electrical applications, including industrial systems utilizing electrical devices for improved safety and security.

The subject addressable electric safety contact monitoring system may be used with many electrical devices including elevator door interlocks, gate switches, limit switches, escape hatches, emergency stop switches and devices using an electric contact point system. The device and method may be used for monitoring current crossing a set of contact points. A typical addressable electric safety contact monitoring system may include a mechanical or electromechanical latching device which engages a lock or similar receptor and which registers a condition of the device such as on-off, open-closed and locked-unlocked states. The addressable electric safety contact monitoring system is designed to ensure that a desired state is preserved, the location of the fault is located and to react when the desired condition no longer exists. Further, faults may be remotely observable for a large number of monitor locations.

An addressable electric safety contact monitoring system may have a useful application with the maintenance and operation of an elevator door interlock system, such as may be found in both modern and older buildings. In normal elevator operations, an elevator door interlock system will control the shaftway or hoistway doors at every floor, ensuring each is closed unless an elevator car is properly located at a given door and the appropriate mechanical or electrical signal is given so that the shaftway and car doors may open cooperatively. As is well known, elevator installations for large buildings will have a correspondingly large number of individual door interlock devices for every floor serviced by an elevator car in a given shaft. The number of such systems in a building is further multiplied by the number of elevator shafts installed therein. Such interlock devices are critically important for the safe operation of the elevator system and these all require periodic maintenance as well as occasional repair.

In a typical elevator installation, a door interlock system starts at either the top or bottom floor and an individual interlock device is installed at each successive floor. The devices utilize conventionally available electrical current, passing the current through each device and over a pair of electrical contact points when the interlock is properly engaged. Each working device passes the current to the next adjacent interlock location, usually the next floor above or below.

In a properly operating elevator installation, an operator may observe an all-closed condition whenever the current used at the originating location passes in series through every intermediate door interlock and signals an uninterrupted electrical circuit throughout the installed series of door interlocks. Typically such a signal, or lack thereof, can operate a safety relay switch at the elevator system control panel, shutting off the system power supply for safety as may be necessary. The current passes in series (rather than in parallel) as a safety measure to make sure that all installed door interlocks are operating properly before the elevator can function.

A significant, practical problem arises when there is a faulty door interlock, or an improperly engaged door interlock at an unknown location along the series of such door interlock devices in the elevator shaftway. Heretofore it has been necessary to send an elevator technician to each door interlock location to determine the source of such a fault.

An earlier method to monitor the state of doorkeepers in an elevator system is seen in the U.S. Pat. No. 6,382,362 which utilizes an optical interlock with a transmitter and receiver apparatus. Another example is seen in U.S. Pat. No. 6,988,594 which uses a temporal sensor for evaluating the status of a doorkeeper. These differ from the present monitoring system which offers another approach which is accurate, reliable and easy to troubleshoot. A further example of an elevator monitoring system is seen in U.S. Pat. No. 6,945,363 which discloses an electromagnetic beam detector system for monitoring the state of doors in a shaftway when the door locks are in a closed position. It is possible for such a system to provide a false positive result if a problem occurs or persists in the circuit itself, in which case a technician must visit each door to inspect the actual condition of its door interlock contact. The disclosures of each of the foregoing patents are hereby incorporated by reference.

The addressable electric safety contact monitoring system described in the present application also will be particularly useful for an elevator system and related components undergoing inspection or repairs.

Operation of the subject addressable electric safety contact monitoring system in, for example along a series of shaftway doors, may give a remote visible indication of safe, closed and locked locations, and a different remotely observable indication of the location where a fault occurs. Alternatively, the fault locations can be transmitted using an addressable mechanism that can be observed in a convenient location.

It is therefore an object of the present invention to provide an addressable electric safety contact monitoring system for remotely and visually monitoring a series of electric safety devices and the accompanying mechanical or electromechanical safety door interlocks to which they are related.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
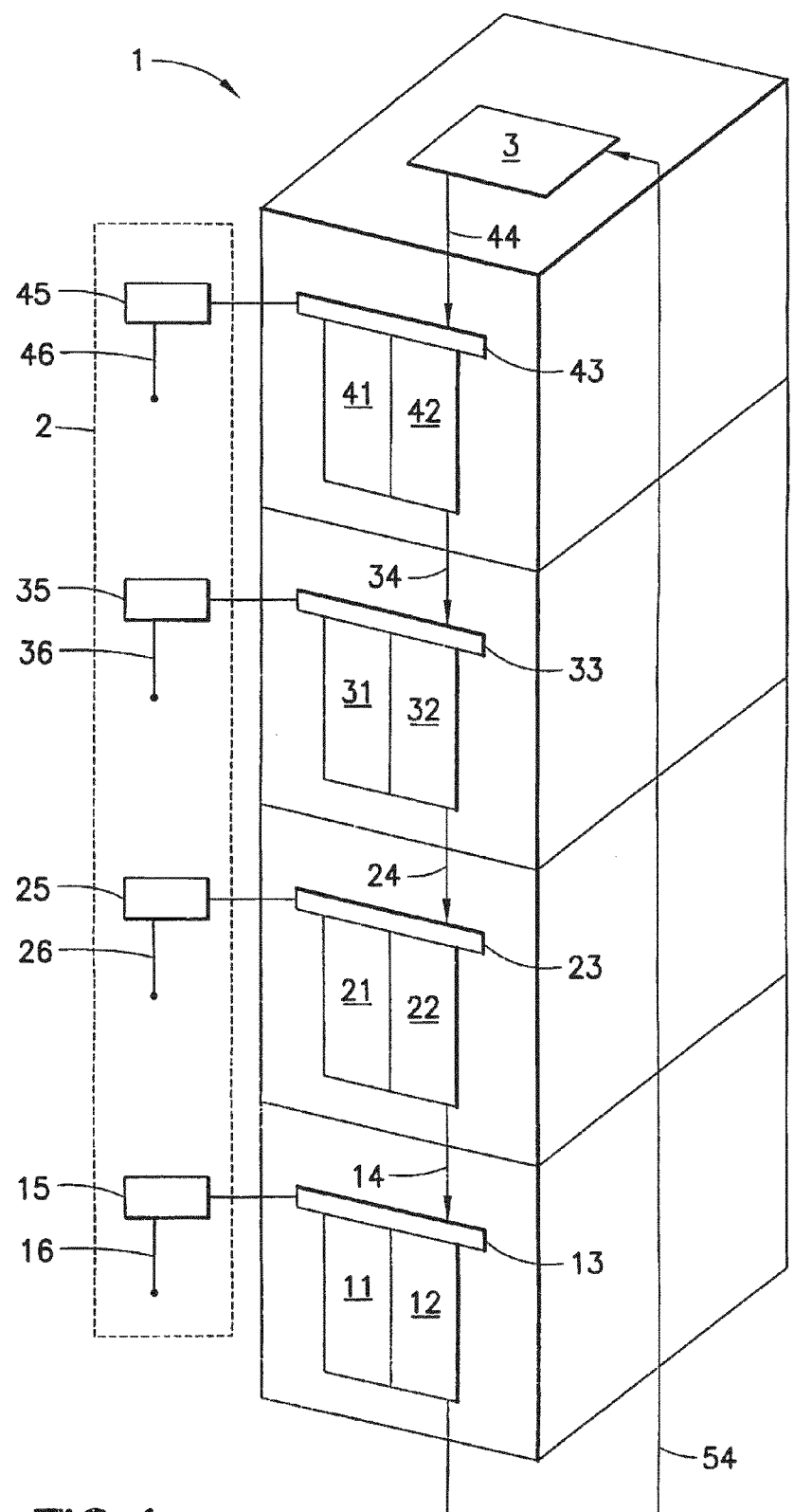
FIG. 1 is a perspective view of an elevator shaft way operation employing the electric safety contact monitoring system of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Although the addressable electric safety contact monitoring system described herein may be usefully employed in a wide variety of safety interlock applications, it is particularly useful in an elevator system. The subject method and apparatus will be described in the context of such a system.

FIG. 1 depicts elevator installation 1 having four stories in this embodiment. Each floor has a pair of elevator hoistway or shaftway doors. Left-hand doors 11, 21, 31, and 41 are paired respectively with right-hand doors 12, 22, 32, and 42. It will be understood that the device and method of the present invention may also be utilized with other elevator configurations, with any number of floors, and including single doors as well as single and dual speed doors. Each set of shaftway doors operates in cooperation with conventional mechanical safety interlock devices 13, 23, 33, and 43 which are designed to ensure that elevator doors do not inadvertently open unless an elevator car is properly positioned. In FIG. 1, elevator system control panel 3 is depicted atop the elevator shaft but may be readily placed anywhere in the system for convenient operation and monitoring. In a conventional commercial elevator installation, control panel 3 will supply system power, with typical voltage varying from about 24 to 120 V. During normal operation, control panel 3 will supply the system voltage to each interlock device via conductor lines 44, 34, 24, and 14, and return the system voltage to control panel 3, completing the circuit via conductor line 54. When a fault is experienced in one of the interlock devices deployed throughout the system, control panel 3 indicates the existence but not the location of the fault using an indicator such as a safety switch or relay device. A fault condition often necessitates manual examination of each door interlock to determine the precise location of the faulty interlock device. Such examination may be costly, time-consuming and potentially unsafe.

The improvement of the present invention involves the utilization of electric safety contact monitoring system 2, used in conjunction with each interlock device of elevator installation 1 in FIG. 1. In this embodiment, individual electric safety contact monitoring devices 15, 25, 35, and 45, are wired with interlock installations 13, 23, 33, and 43 at each set of doors along the shaftway. Terminus lines 16, 26, 36 and 46 indicate the attachment of each device to a neutral reference terminal. The operation of these devices is described in greater detail in subsequent figures.

Figure 2:
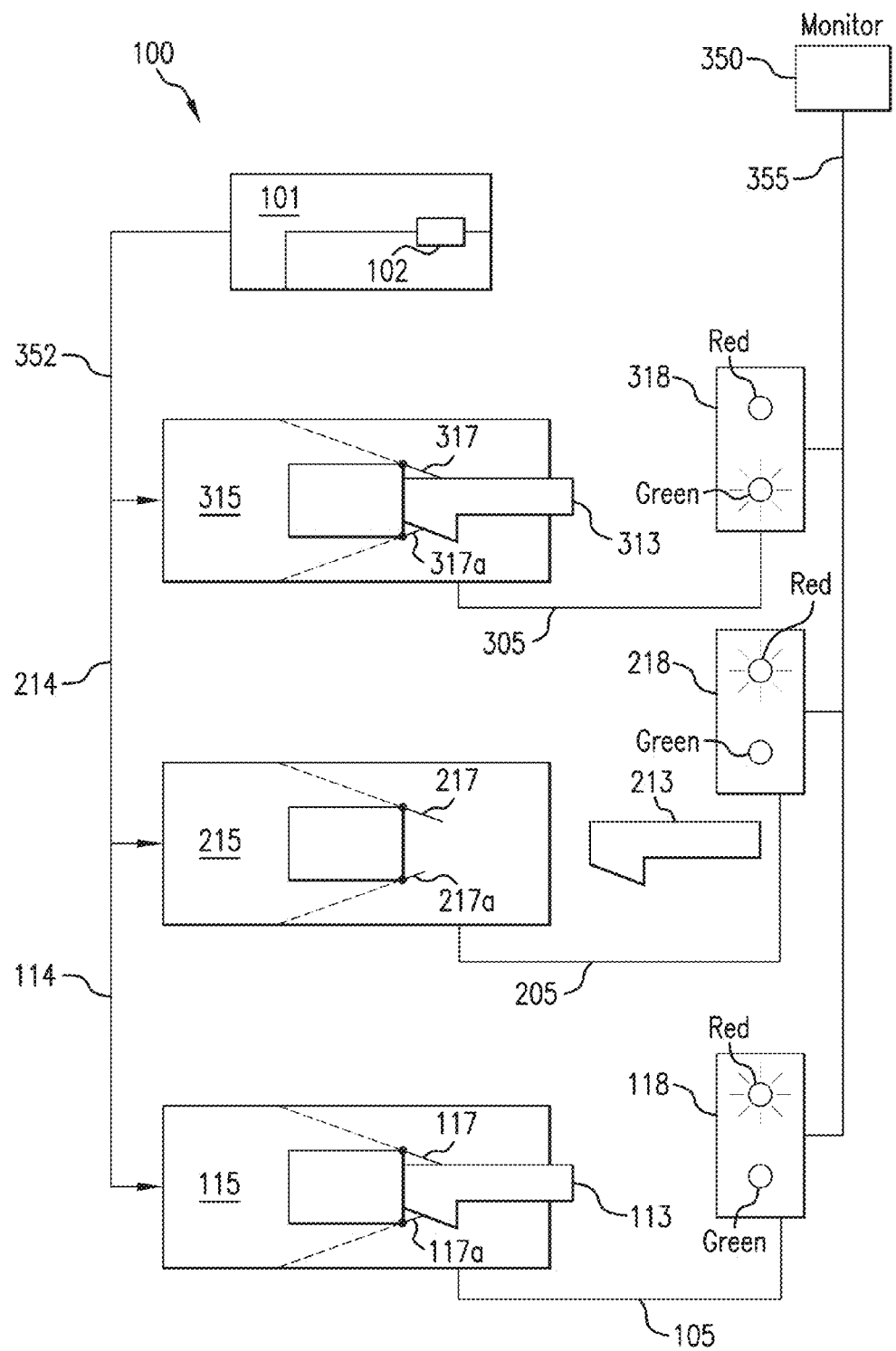
FIG. 2 is a schematic of a circuit used in a typical elevator installation for an addressable electric safety contact monitoring system.

FIG. 2 depicts a schematic embodiment 100 of the present invention in operation. In this figure, addressable electric safety contact monitoring system system control panel 101, containing switch relay 102, supplies system power. Current is conducted via line 352 to the first electric safety device 315. In a preferred embodiment device 315 is an elevator doorkeeper lock, which includes metal contact points 317 and 317a. The contact points are each touching an electrically conducting portion of mechanical doorkeeper 313, a detail of which is shown here properly engaged with the contact points. When doorkeeper 313 is properly engaged with both contact points the addressable electric safety contact monitoring system recognizes the current passing over contact points 317 and 317a. As will be shown below, the addressable safety contact monitoring device 318 is designed so if voltage and current are present on wire 305 the green LED is lit. This embodiment preferably contains a housing incorporating green and red light emitting diodes (LEDs).

Continuing with FIG. 2, the system voltage is conveyed via conductor 214 from properly operating interlock device 315 to next subsequent electric safety device 215 wherein it reaches first contact point 217. In this embodiment doorkeeper 213 is not engaged properly in interlock device 215 and therefore current does not pass over doorkeeper 213 to second contact 217a. The open contact point represents an open circuit and the system voltage and current do not pass via wire 214 to addressable safety contact monitoring device 218. As will be detailed in further detail below, the lack of this system voltage and current will cause the red LED of the addressable safety contact monitoring device 218 to go on and also simultaneously send a preprogrammed numeric address of the fault location via a serial cable 355 to a monitor 350 that may be at a remote location. In turn the system voltage and current do not pass via wire 114 to next subsequent electric safety device 115 and via wire 105 to the next addressable safety contact monitoring device 118. The lack of voltage and current will cause the red LED to go on even though the corresponding doorkeeper 113 is engaged properly with both contact points 117, 117a. However because each addressable safety contact monitoring device is in an interlocking circuit no other preprogrammed address will be sent via a serial cable. Any number of such devices may be arranged in series as appropriate for each installation.

Figure 3:
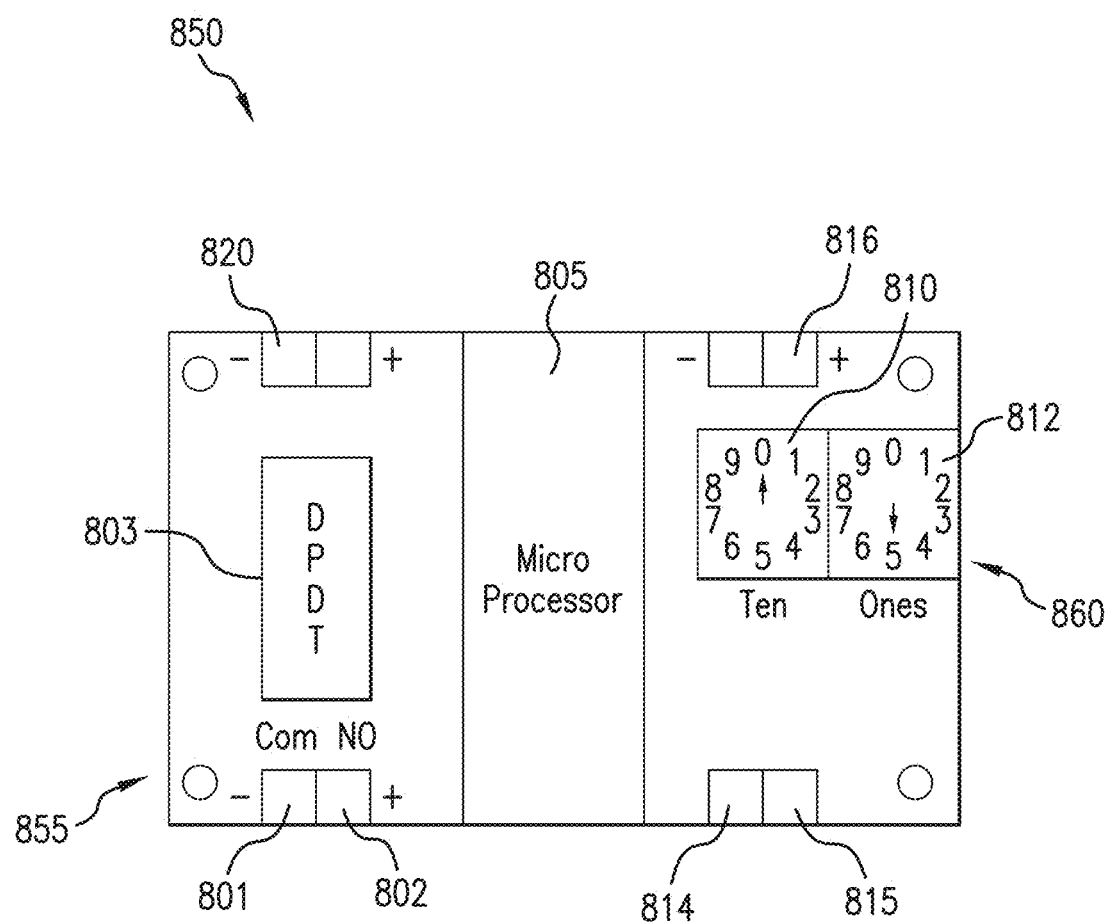
FIG. 3 is a device view of a single device in an addressable electric safety contact monitoring system.

Turning to FIG. 3, shown is a device view of a single device in an addressable electric safety contact monitoring system that is designed to be associated with a device that may have a fault condition. This device is intended to be networked in an interlocking circuit with other devices in the fault condition monitoring network. The addressable devices 850 is divided into three distinct portions, the input section 855, the processing section 805 and the output section 860. The input section consists of a voltage input terminal block and neutral terminal block 820 where the input voltage for the DTDP (double-pole double-throw) relay 803 is supplied from the electric safety device being monitored. A signaling section terminals 801 and 802, with a zero volt input providing the necessary input to the microprocessor allowing for transmitting of the preprogrammed address. By utilizing the DPDT relay 803, terminal 801 and 802 as the ability to interlock each device by switching the zero volts needed to allow the microprocessor to transmit it preprogrammed address between NO (normally open) and the common Under normal operation where no fault condition exist zero volts will be in pulled through terminal 801 as a common on the DTDP relay pole #4 in FIG. 4 (694) and will return as an output over the NO side of the DTDP relay pole #5 in FIG. 4 (695) to terminal block 802. Zero volts is then conveyed via 712 in FIG. 5, to addressable safety contact monitoring device 741 in FIG. 5, where it becomes the common to input 801. The double throw double pole relay 803 also controls the state of the red and green LEDs: see pole #9 in FIG. 4 (699) that connects to pole #10 (690) that controls the state of the red LED and pole #8 (698) that controls the state of the green LED.

Turning back to FIG. 3, the processing section 805 interfaces with the input section 855 via the DTDP relay 803. The processing section may consist of a microprocessor. The microprocessor is used to control the output of both red and green LEDs. The microprocessor also stores the user defined preprogrammed address, also defines when to send preprogrammed address, which may be via the RS485 driver.

The main function of the output section 860 is to transmit the preprogrammed address of the addressable device 850 upon being instructed to do so by the processing section 805. The address of the addressable device may set by 2 DIP switches 810, 812, each of which may be set from 0 to 9. The combination of these 2 DIP switches may result in a total of 100 variations from 00 to 99, because the first dip switch 810 represents the more significant digit and the second DIP switch 812 represents the less significant digit. Once triggered, the address of the addressable device 850 as set by the DIP switches 810, 812 is transmitted out of the addressable device 850 via terminals 814 and 815.

This transmission may be accomplished using the RS-485 protocol. RS-485, also known as TIA-485-A, ANSI/TIA/EIA-485, TIA/EIA-485, or EIA-485, is a standard defining the electrical characteristics of drivers and receivers for use in balanced digital multipoint systems. The standard is published by the Telecommunications Industry Association/Electronic Industries Alliance (TIA/EIA). Digital communications networks implementing the RS-485 standard can be used effectively over long distances and in electrically noisy environments. Multiple receivers may be connected to such a network in a linear, multi-drop configuration. These characteristics make such networks useful in industrial environments and similar applications. This makes the RS-485 protocol a wise choice for transmitting the address of the addressable device 850 to a remote location for viewing.

This transmission may also be accomplished by the use a controller area network (CAN bus). The CAN bus is a vehicle bus standard designed to allow microcontrollers and devices to communicate with each other in applications without a host computer. It is a message-based protocol, designed originally for multiplex electrical wiring within automobiles, but is also used in many other contexts. The latest version published by Bosch is CAN 2.0 published in 1991. This specification has two parts; part A is for the standard format with an 11-bit identifier, and part B is for the extended format with a 29-bit identifier. A CAN device that uses 11-bit identifiers is commonly called CAN 2.0A and a CAN device that uses 29-bit identifiers is commonly called CAN 2.0B. CAN in Automation (CiA) also published CAN standards; CAN Specification 2.0 part A and part B, but their status is now obsolete (superseded by ISO 11898-1). In 2012 Bosch released CAN FD 1.0 or CAN with Flexible Data-Rate. This specification uses a different frame format that allows a different data length as well as optionally switching to a faster bit rate after the arbitration is decided. CAN FD is compatible with existing CAN 2.0 networks so new CAN FD devices can coexist on the same network with existing CAN devices. These features make CAN a wise choice for transmitting the address of the addressable device 850 to a remote location for viewing.

The output section 860 also may include a power input 816 that may be a terminal blocks for 5 VDC-12 VDC microprocessor power supply to drive the power needed for the microprocessor. An LED may be used (not shown) to verify that the addressable device 850 is operating properly. The color of this LED may vary.

Figure 4:
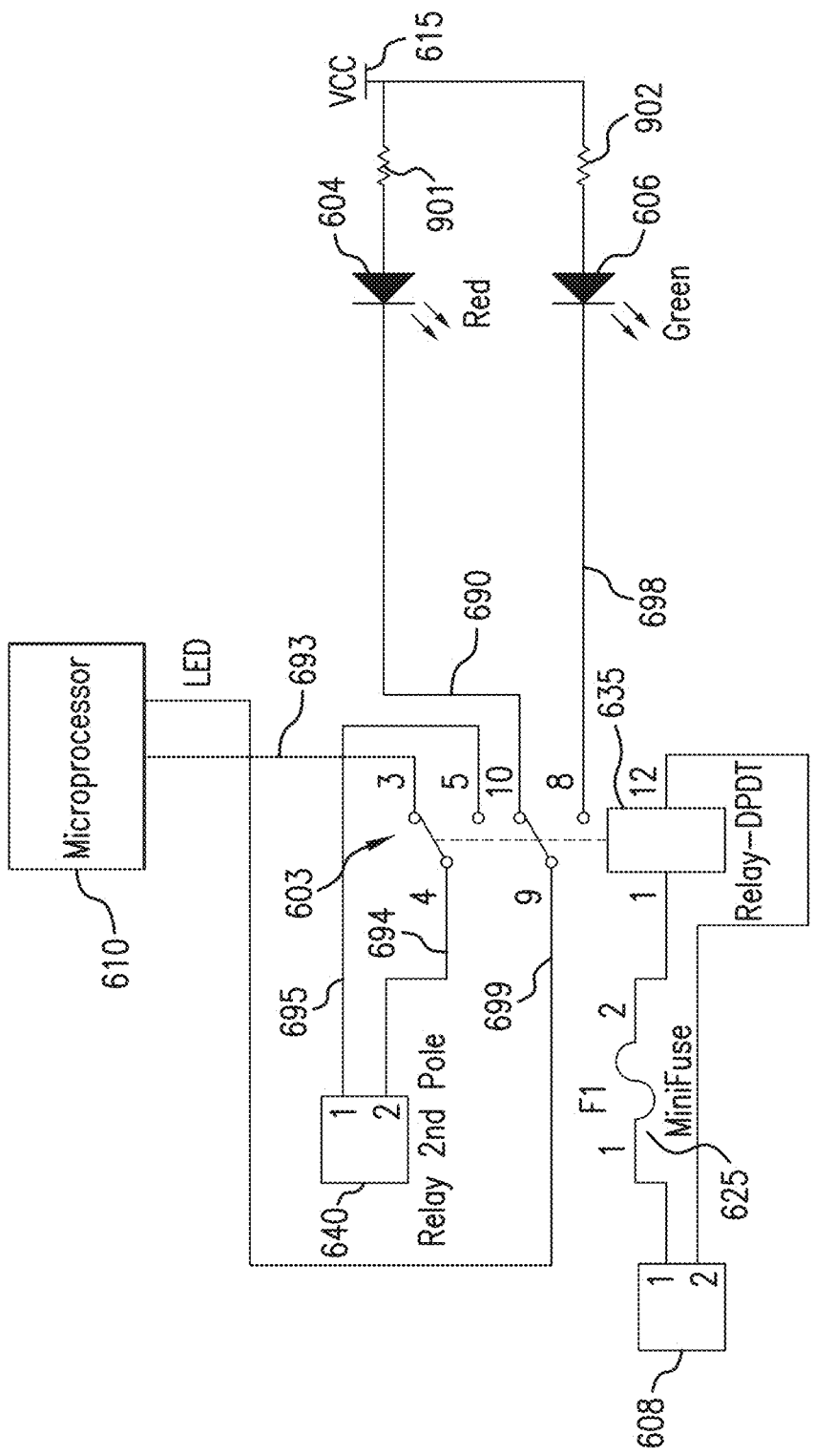
FIG. 4 is a detailed circuit view of a portion of a single device in an addressable electric safety contact monitoring system.

Turning to FIG. 4, shown is a detailed circuit view of the input and interlocking portion of a single addressable contact monitoring system that is designed to monitor a device that may have a fault condition. Shown is a VCC power source 615 which provides the positive voltage needed to power both a red LED 604 and green LED 606. VCC is fed through resistors 901 and 902 then to LED 604, 606. Terminal 608 provides the input voltage from the device that is being monitored. Input voltage is fused 625 to protect the device being monitored from short circuit or component failure. Voltage is then supplied to the DPDT relay 635 that is used to control a group of internal contacts 603. Internal contacts 9 (699), 8 (698) and 10 (690) are used to control LEDs used for status lights. Terminal 640 is the zero volts input and output signal that is used to trigger the addressable contact monitoring system to send its unique address. Zero volts input is interlock via DPDT internal contacts 3 (693), 4 (694), and 5 (695).

This system is designed so that when there is no power to input 608, (which indicates a fault condition somewhere in the safety device being monitored by addressable electric safety contact monitoring system), the double pole double throw relay 635 remains in its default position (shown in the diagram). In this default position DPDT internal contact 9 (699) connects with contact 10 (690) thereby completing the circuit to light the red LED 604. Also the second pole of DPDT relay 635 provides a zero volt signal to the microprocessor 610. This is because in this mode, the DPDT relay internal contact 694 connects with contact 693 thereby completing the circuit to signal the microprocessor. When DPDT relay 635 is in its defaulted position internal contact 5 (695) is in its open state, thus zero volts input from contact 4 (694) is not outputting to additional addressable safety contact monitoring device. Thus only one fault location can be transmitted. All other addressable monitoring devices are locked out.

In this manner, the properties of the double pole double throw relay 635 are used to give two indications of fault: a visual indication (by means of the red LED 604) and an electronic indication (by signaling the microprocessor 610). As discussed above, the microprocessor 610 will also process this electronic fault indication and transmit the address of the single improved addressable safety contact monitoring system for further processing.

In contrast, when there is no fault condition in the network, power is provided to the fault signal detector 608. The current from the fault signal detector 608 activates the double pole double throw relay 635 to its "power" position (not shown in the diagram). In this power position (1) DPDT internal contact 4 (694) connects with internal contact 5 (695) thereby excluding that circuit from the microprocessor and thereby outputting zero volts to next addressable safety contact monitoring device; and (2) internal contact 9 (699) connects with internal contact 8 (698) thereby completing the circuit to light the green LED 606. In this manner, the properties of the double pole double throw relay 635 are used to give two indications of no fault: a visual indication (by means of the green LED 606) and an electronic indication (by no longer signaling the microprocessor 610).

This arrangement demonstrates a key safety feature of the addressable electric safety contact monitoring system. In a safety system where all doubts must be resolved in favor of warning that a fault condition exists, the default position in this system is to provide indication of a fault condition. Only an active signal from the fault signal detector 608 (which only occurs when everything in the network is operating properly) will trigger the necessary changes to show a no-fault condition. If the fault signal detector 608 fails to provide a signal for any reason—whether there is a fault in the system or in the fault signal detector 608 itself—a fault notice is triggered.

Figure 5:
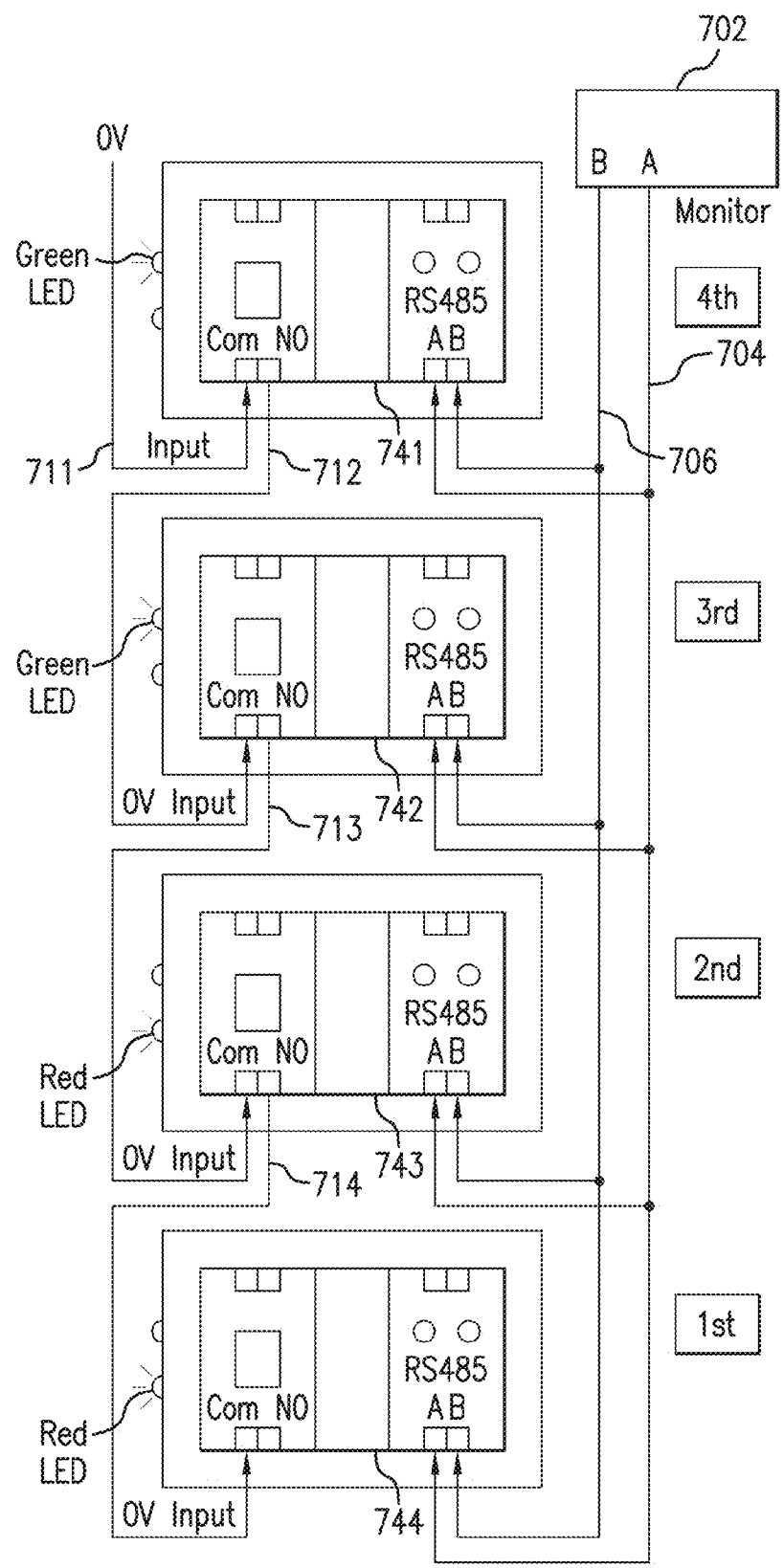
FIG. 5 is another embodiment of a schematic of an addressable electric safety contact monitoring system.

Turning to FIG. 5, shown is another embodiment of a schematic of an addressable electric safety contact monitoring circuit used in a typical elevator installation. As an initial matter, this figure demonstrates another safety feature of the system: that all devices are wired in a interlocking circuit so that every device must be functioning in order for a no-fault signal to be generated Now turning to FIG. 5 in detail, the addressable electric safety contact monitoring devices 741, 742, 743, 744 are connected in an interlocking circuit as follows. Wire 711 is tied to ground (0 Volts) on one end and serves as the input into the fourth addressable monitoring device system 741. If there is no fault in the system monitored by fourth addressable monitoring device 741, 0 volts common input will return as an output through the NO (normal open) side of the DPDT relay 712.

Turing to the third addressable safety contact monitoring device 742, the output 712 from the fourth addressable safety contact monitoring device 741 will become the common for the third device 742. Since no fault condition exists, no address information of the fourth or the third addressable safety contact device will be sent via serial cable 704, 706 to the monitor 702 and the red LED 604 (as shown in FIG. 4) will be illuminated.

Turning to the second addressable safety contact monitoring device 743, 0 volts output will be forwarded via 713 from the third device 742 to the second device 743. In this example, the second device 743 has detected a fault condition. As shown above in FIGS. 3 and 4, because of this fault, the 0 volts input does not across the internal contacts 4 (694) and 5 (690) of the DPDT relay so the preprogrammed address will be sent via serial cable 704, 706 to monitor 702 and the red LED 604 (as shown in FIG. 4) will be illuminated.

Turing to the first addressable safety contact monitoring device 744, wire 714 serves as the output out of the second safety contact addressable monitoring device 743 and serves as the input into the first device 744. In this case, there is a fault in the system monitored by the second device 743. Because of this fault, the 0 volts output from second device 743 does not cross the internal contact 4 (694) and 5 (695) of the DPDT relay or addressable monitoring device 743 therefore 0 volts is not forwarded to first device 744. Because of this fault, both the red LEDs of addressable monitoring devices 743 and 744 will be illuminated giving an observable indication of the fault. However only the address of addressable safety contact monitoring device 743 will be displayed on the monitor 702.

As an example, an elevator may be also associated with an applicable electric safety device installed on each floor in the elevator shaft as shown in FIG. 1. But it is critical to note that the addressable safety monitoring devices may be used on any installation where a series of faults must be monitored. While elevators are discussed with some detail herein, this is only one specific embodiment and does not limit the applicability of this invention. The addressable electric safety contact monitoring system may interface with any type of fault detection device, whether through mechanical means, motions sensors, sound sensors, visual sensors, cameras, infrared detectors or any other detection based medium. The fault detection device may be related to any type of mechanical or electrical machine where safety of the user is needed.

The method of remotely locating faults in a safety control devices is readily accomplished with the devices and systems described above and can be usefully adapted to a wide range of electrical devices which require safety monitoring and remote detection of the location of such safety faults.

In the foregoing specification, specific embodiments have been described. However, one of ordinary skill in the art appreciates that various modifications and changes can be made without departing from the scope of the invention as set forth herein. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. An addressable component comprising:
   an input terminal, wherein the input terminal receives an external signal relating to a safety fault;
   a switch having a default position and an active position;
   a first electric connection between the input terminal and the switch;
   a microprocessor, wherein the microprocessor processes the external signal to create a fault address;

a second electric connection between the microprocessor and the switch;

an address selection mechanism, wherein the address selection mechanism processes the fault address;

a third electric connection between the microprocessor and the address selection mechanism;

wherein when the external signal is activated:
a) the switch changes from the default position to the active position;
b) the microprocessor is activated; and
c) the microprocessor activates a signal on the third electric connection corresponding to the fault address.

2. The addressable component as in claim 1, further comprising a first light device and a second light device, wherein the first light device is electrically connected to the switch when the switch is in the default position and wherein the second light device is electrically connected to the switch when the switch is in the active position.

3. The addressable component as in claim 2, wherein the first light device is a red light-emitting diode and wherein the second light device is a green light-emitting diode.

4. The addressable component as in claim 3 wherein the red light-emitting diode and the green light-emitting diode are connected to a common power source.

5. The addressable component as in claim 4, wherein the address selection mechanism comprises at least two switches.

6. The addressable component as in claim 5, wherein each of the at least two switches is capable of being selectively set from zero through nine.

7. The addressable component as in claim 3 wherein the switch is a double pole double throw relay device.

8. The addressable component as in claim 3, further comprising a fuse between the input terminal and the switch.

9. The addressable component as in claim 1, wherein the external signal is activated when there is no external safety fault.

10. A safety system comprising:
an address monitor for displaying at least one component address; and
a plurality of components, wherein each of the plurality of components has a different component address, and each of the pluarality of the components comprises:
a) an input terminal, wherein the input terminal receives an external signal relating to a safety fault;
b) a switch having a default position and an active position;
c) a first electric connection between the input terminal and the switch;
d) a microprocessor, wherein the microprocessor processes the external signal to output the component address;
e) a second electric connection between the microprocessor and the switch;
f) an address selection mechanism, wherein the address selection mechanism processes the component address;
g) a third electric connection between the microprocessor and the address selection mechanism;
h) an output terminal; and
i) a fourth electric connection between the address selection mechanism and the output terminal;
j) wherein when the external signal is activated:
a. the switch changes from the default position to the active position;
b. the microprocessor is activated; and
c. the microprocessor activates, via the third electric connection, a signal on the fourth electric connection corresponding to the address selection mechanism;
wherein each of the output terminals of the each of the plurality of components is connected to the address monitor.

11. The system as in claim 10, wherein each of the plurality of components further comprises a first light device and a second light device, wherein the first light device is electrically connected to the switch when the switch is in the default position and wherein the second light device is electrically connected to the switch when the switch is in the active position.

12. The system as in claim 11, wherein the first light device is a red light-emitting diode and wherein the second light device is a green light-emitting diode.

13. The system as in claim 12, wherein the red light-emitting diode and the green light-emitting diode are connected to a common power source.

14. The system as in claim 12, wherein the switch is a double pole double throw relay device.

15. The system as in claim 10, wherein the address selection mechanism comprises at least two switches.

16. The system in claim 15, wherein each of the two switches is capable of being selectively set from zero through nine.

17. The system as in claim 10, wherein each of the plurality of components further comprises a fuse between the input terminal and the switch.

18. The system as in claim 10, wherein in each of the plurality of components the external signal is activated when there is no external safety fault associated with that component.

19. The system as in claim 10, wherein in each of the plurality of components the external signal is activated when there is no external safety fault associated with that component and at least one other component.

20. The system as in claim 10, wherein the address monitor displays the least significant component address from the at least one component.

\* \* \* \* \*